(12) United States Patent
Pascale

(10) Patent No.: US 10,795,545 B2
(45) Date of Patent: Oct. 6, 2020

(54) RAPID RESPONSE TABS/COMPUTER KEYBOARD KEY

(71) Applicant: Steven Patrick Pascale, San Clemente, CA (US)

(72) Inventor: Steven Patrick Pascale, San Clemente, CA (US)

(73) Assignee: Steven Patrick Pascale, San Clemente, CA (US)

( * ) Notice: Subject to any disclaimer, the term of this patent is extended or adjusted under 35 U.S.C. 154(b) by 280 days.

(21) Appl. No.: 14/545,989

(22) Filed: Jul. 16, 2015

(65) Prior Publication Data
US 2017/0017363 A1    Jan. 19, 2017

(51) Int. Cl.
| | | |
|---|---|---|
| G06F 3/02 | (2006.01) |
| G06F 3/0483 | (2013.01) |
| G06F 16/71 | (2019.01) |
| G06F 3/0489 | (2013.01) |
| G06F 1/16 | (2006.01) |
| B42D 9/00 | (2006.01) |
| B42F 21/06 | (2006.01) |

(52) U.S. Cl.
CPC .......... *G06F 3/0483* (2013.01); *G06F 1/1671* (2013.01); *G06F 3/0219* (2013.01); *G06F 3/0489* (2013.01); *G06F 16/71* (2019.01); *B42D 9/00* (2013.01); *B42F 21/06* (2013.01); *B42P 2221/02* (2013.01); *B42P 2221/04* (2013.01)

(58) Field of Classification Search
None
See application file for complete search history.

(56) References Cited

U.S. PATENT DOCUMENTS

| | | | | |
|---|---|---|---|---|
| 5,202,828 A * | 4/1993 | Vertelney | .............. | G06F 3/0481 |
| | | | | 715/236 |
| 6,239,391 B1 * | 5/2001 | Nishijima | .......... | H01H 13/7006 |
| | | | | 200/302.2 |
| 7,653,872 B2 * | 1/2010 | Yamashita | ............ | G06F 17/241 |
| | | | | 715/230 |

(Continued)

OTHER PUBLICATIONS

Peter Bright; "Stop trying to innovate keyboards. You're just making them worse;" ARS Technica; Jan. 2014; https://arstechnica.com/staff/2014/01/stop-trying-to-innovate-keyboards-youre-just-making-them-worse/.*

(Continued)

*Primary Examiner* — Daniel J Colilla

(57) ABSTRACT

An electronic keyboard consisting of a Qwerty arrangement whereby a tab flag key provides a given electronic function for highlighting words and paragraphs found in documents, charts, ebooks etc. The net effect yields a rapid response. Furthermore, operational benefits also include bookmarking and/or grouping (prioritizing data) particular page(s). Noteworthy, consideration to naming conventions with particular attention to the Tab key warrants change. To that end, the current Tab key might be better served as "Cursor Indent" or even graphically as an arrow pointing right (090 degrees). Moreover, a grammatically incorrect usage of the word Tab (needless to say) is a judgement that may indeed presuppose a nonexistent standard of usage. Research suggests that that the word "TAB" (according to Webster) is a "projection flap, short strip attached to an object to facilitate opening, handling, or identification."

13 Claims, 10 Drawing Sheets

(56) References Cited

U.S. PATENT DOCUMENTS

| | | | |
|---|---|---|---|
| 8,539,336 B2* | 9/2013 | Griffiths | G06F 17/2247 |
| | | | 715/200 |
| 9,128,608 B2* | 9/2015 | Pallakoff | G06F 3/0483 |
| 2003/0014674 A1* | 1/2003 | Huffman | G06F 1/1616 |
| | | | 713/300 |

OTHER PUBLICATIONS

"Topic: J-Shaped Return Keys;" Geekhack keyboard enthusiasts; Dec. 2010; https://geekhack.org/index.php?topic=13697.0.*
The darnedest thing; "poker 2;" Mar. 2015; http://thedarnedestthing.com/poker%202.*

* cited by examiner

Figure 3
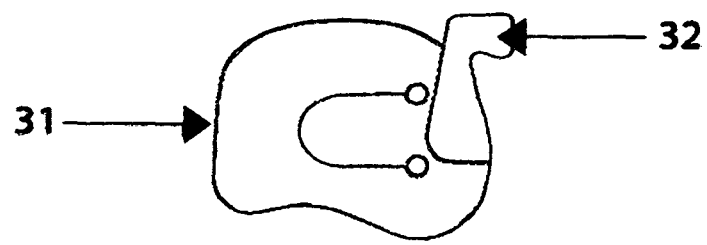
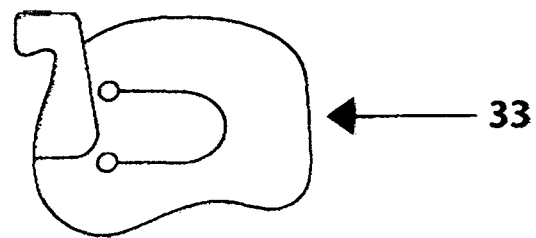
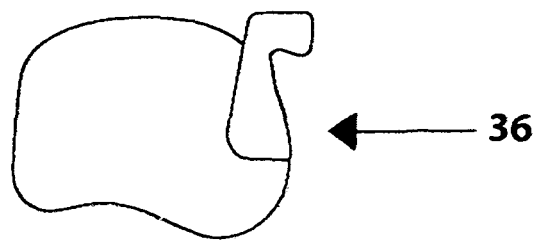

RAPID RESPONSE TABS/COMPUTER KEYBOARD KEY

Field of Search: 40/2R, 299, 638, 359, 360, 641, 658, 666; 283/36, 37, 39, 41; 283/109, 41; 229/67.1, 67.2; 312/184; 395/155, 159, 161, 600, 350; 715/777, 738-749, 765-767; 200/5R, 5A, 6A, 86R, 1596, 302.2, 314, 339, 302.1, 160; 364/518, 521; 340/701, 703, 748; 40/649, 621; 434/128; 134, 73, 168, 172; 446/131, 132; 273/448, 155, 239

U.S. Patent Documents

U.S. Pat. No. 2,007,003 July 1935 Rosen
U.S. Pat. No. 2,601,026 June 1952 Jones
U.S. Pat. No. 3,238,947 March 1966 Churnick
U.S. Pat. No. 3,244,179 April 1966 Porteous et al.
U.S. Pat. No. 3,473,827 October 1969 Leadbetter
U.S. Pat. No. 3,854,229 December 1974 Morga
U.S. Pat. No. 4,061,808 December 1977 Sato
U.S. Pat. No. 4,428,9943 September 1981 Sato
U.S. Pat. No. 4,882,862 November 1989 Slavsky, Sr.
U.S. Pat. No. 5,345,543 September 1994 Capps et al.
U.S. Pat. No. 5,392,387 February 1995 Fitzpatrick et al.
U.S. Pat. No. 5,428,729 June 1995 Cang et al.
U.S. Pat. No. 5,500,929 March 1996 Itri et al.
U.S. Pat. No. 5,796,404 August 1998 Gentner
U.S. Pat. No. 5,863,019 January 1999 Rose et al.
U.S. Pat. No. 6,452,611 September 2002 Gerba et al.
U.S. Pat. No. D490,440 May 2004 Ording et al.
U.S. Pat. No. 7,568,004 July 2009 Gottfried Current U.S.: 40/641; 715/777; 715/744; 715/747; 40/638; 229/67.1; 229/67.2; 283/36; 40/359;
40/360; 40/658;
200/5A; 200/339; 200/512; 200/6A; 715/223; 7157227; 715/248; 40/649, 273/155; 273/239;
273/448; 40/621; 434/128; 434/134; 434/168; 434/172; 434/73; 446/131; 446/132;
D19/34: D19/1, D19/2, 32, 34, 65; D11/78.1; 24/67R, 67.9; 116/234, 237, 239; 402/19; 40/568, 666
D19/90, D19/88, 83, 78, 77, 75, 65, 57, 56, 32; D11/78.1; D10/31; 116/234, 237, 239; 24/67.9 370/312, 709/225; 709/219; 709/229

Current CPC Class: G06F 9/4443 (20130101); G06F 3/0483 (20130101); G09F 23/10 (20130101); G09F 2003/0201 (20130101); G09F 2003/0264 (20130101); G09F 2003/023 (20130101); G09F 2003/0241 (20130101); G09F 2003/0208 (20130101); B42F 21/065 (20130101) H01H 13/702 (20130101); H01H 13/807 (20130101); H01H 13/80 (20130101); H01H 2239/022 (20130101); H01H 2201/006 (20130101); H01H 2203/02 (20130101); H01H 2209/014 (20130101); H01H 2213/01 (20130101); H01H 2215/008 (20130101); H01H 2217/006 (20130101); H01H 2219/002 (20130101); H01H 2219/026 (20130101); H01H 2219/04 (20130101); H01H 2221/002 (20130101); H01H 2221/012 (20130101); H01H 2221/016 (20130101); H01H 2221/026 (20130101); H01H 2221/046 (20130101); H01H 2221/056 (20130101); H01H 2221/066 (20130101); H01H 2223/002 (20130101); H01H 2225/002 (20130101); H01H 2229/042 (20130101); H04H 20/38 (20130101); G06F 3/04897 (20130101): G09F 7/04 (20130101); G06Q 30/02 (20130101) Current Intl Class: G006F 3/048 (20060101); G06F 3/033 (20060101); G06F 003/00; G09F 3/10 (20060101); G09F 3/02 (20060101); G09F 023/10 ( ). 842F 21/06 (20060101); B42F 21/00 (20060101); G09F 23/10 (20060101); G09F 23/00 (20060101) H01H 13/70 (20060101); H01H 13/702 (20060101); H01H 13/700; H04H 20/71 (20080101) G06F 3/023 (20060101); G06F 015/200; G09F 3/18 (20060101); G09F 3/20 (20080101); G09B 19/22 (20060101); G09F 7/04 (20060101); G095 27/08 (20060101); G098 7/02 (20130101):

FIELD OF INVENTION

The invention pertains to an electronic keyboard utilizing Qwerty arrangement, wherein a "Tab Flag" key is added for true tab like functionality, replacement of naming convention to an existing tab key, and repositioning a tilde key while eliminating a redundancy key.

BACKGROUND OF THE INVENTION

Novel invention was created i.e. a tab flag key configured to provide a graphic in an electronic document in order to highlight specific Information.

With this in mind, presently there are no products (keyboard) offering an electronic tab function. What's more, software tabs are limited to only ebook tablets. For this reason . . . given MS Word, Excel spreadsheet, and electronic Jepp charts . . . a tab and/or flag "placement" would prove to have significant utility. More importantly, an existing "Tab" key found on computer hardware is not conducive and is inappropriate as it does not provide a marking function nor does it project a shape offset in a given page. In reality, what a "Tab" key currently provides today is simply an ability to indent . . . i.e. moving a cursor "right" 16 spaces. Consequently, prior inventions can be viewed along the lines of unsuitable having an inaccurate naming conventions.

An industry example—pilots flying under IFR rules (Instrument Flight) use Jepp Charts—approach and departure plates. As such, Jepp offers 3 manual "tabs" A.) Up Front B.) Middle C.) Aft Section in the form of binder dividers. Moreover, these tabs are made of plastic and held in place by a three-ring metal binder clamp. Additionally, pilots are also said to use sticky notes that may/or may not be torn in order to highlight a particular page noteworthy of future reference.

Prominently, Jepp charts (now owned by MicroSoft) are now said to offer an electronic format selling 50% for use on an iPad while 50% use remains traditional hard copy. Furthermore, Jepp has markedly commented that they predict this electronic trend to follow suite for some years to come. Of interest, commercial airline pilots in the U.5, are now being asked to fly with electronic Jepp charts. Their corresponding need for tabs and flags with this product seems obvious which inevitably will yield an improved flight operations. Purposely, for categorizing, highlighting, marking, and denoting important information . . . tab flags will ensure additional safety. For this reason, the present invention was designed to promote visual awareness; thereby, enabling quick reference to important air traffic control frequencies, alternative airports, approach procedures, descent profiles, glide slopes, emergencies, airport taxi diagrams, etc.

SUMMARY OF THE INVENTION

The present invention is directed to a novel electronic key within a Qwerty arrangement. Documents, ebooks as well as electronic chart applications may be among a first group of industry adoption. Distinctively, the given invention provides an ability to respond quickly by using flags to highlight key information as well as pages in a report. Advantages of the invention will be apparent upon referencing the following detailed descriptions and figures.

Notably the invention is not intended to be exhaustive or limited.

BRIEF DESCRIPTION OF THE DRAWINGS

The unique characteristic of the invention are set forth in the following figures.

The invention itself; mode of use, and objectives will best be understood by referencing subsequent detailed description and accompanying illustrative drawings.

FIG. 3 tab flag illustrative embodiment depicting contrast in color between flags and tabs and electronic tab clipping mechanism utilizing a two apertures;

DETAILED DESCRIPTION OF THE PREFERRED EMBODIMENTS

Figure 1:
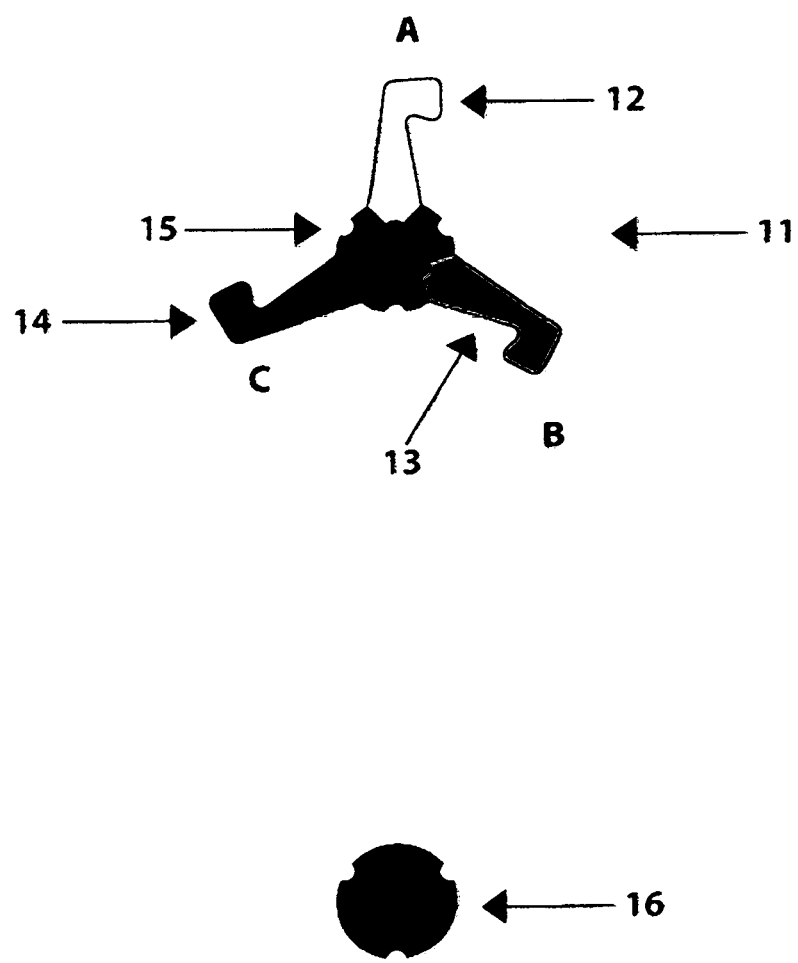
FIG. 1 pictorial representation of a flag wheel.

With reference to the figures and in particular FIG. 1, an illustration shows a flag wheel used as a tab; wherein said wheel can be re-positioned to utilize one of three colors i.e. green-yellow-red.

A pictorial representation of the flag wheel is seen in 11. "A" represents a position on a 360 degree radial, said vertical equivalent "0" degrees and 12 yellow, "B" represents a flag at 120 degrees and green, "C" at 240 degrees and 14 red. A rotational wheel 15 connects the plurality of flags to a central hub.

A view of the flag wheel back surface is shown in 16. Also illustrated is an isolated view of a rotational wheel 15.

Figure 2:
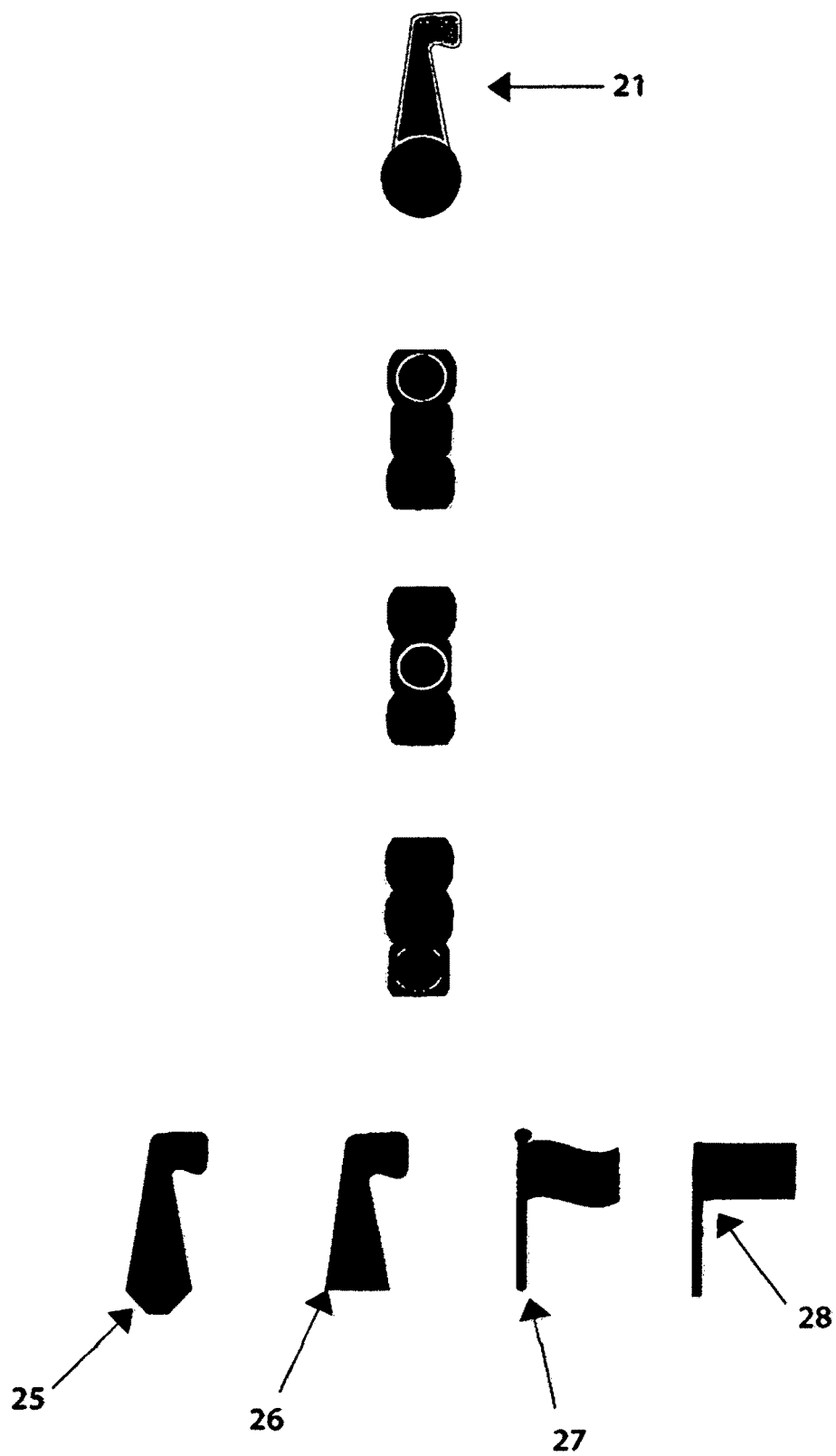
FIG. 2 single flags, traffic signal indicators depicting positions red-yellow-green, and four different highlighting flags.

Turning to FIG. 2 an apparatus is depicted containing a singular flag coupled with a wheel base 21. Then, a "red light" tab is seen in 22, a "yellow light" depicted in 23, and a "green light" in 24, followed by four different shaped flags 25, 26, 27, and 28.

23 depicts a rotational wheel wherein 24 flag is combined to form a "top-of-a-page" tab while 25 represents the surface area for placing indicia with a permanent and/or wet erase marker. A truncated flag 26 is used for highlighting specifics where space is at a minimum for doing so. Additionally, 26, 27, and 28 are of a more conventional flag design.

The tab flag 31 of the invention may be mounted at a desired "side-edge" location. The integrated flag 32 of a different hue combination. The depicted example shown in 33 is a "left" side edge tab flag. With reference to 34, the unique cut line when coupled with two apertures 35 provides an image of a "gripping tab functionality." 36 provides a view of aft looking forward (backside). A tab flag consist of 4 rounded lobes with different (outward) radius's as well as 1 inward radius between 2 lower lobes; and incorporates an integral flag on the upper right lobe with or without same color contained on tab portion. Standard size depends on computer screen and zoom but ideal dimensions uses as an office supply might be estimated at approximately 1.5" in height and 1.5" width, thickness approximately 1/32 to 3/32 pending plastic, plastic hybrid and/or card stock with plastic substrate. Ideally, material consists of an upper and lower panel with fiber grain manufactured in a lateral direction (long) rendering rigidity to facilitate a tension-like bend with spring effect, and attachment to page; and "U" cut flap that makes the most of a clipping mechanism and is combined with two apertures, inserting a page edge along one "side" by bending the flap downward (in this instance said apparatus sits on top of a page) and inserting the page through the "U" flap die cut and/or; inversely, the tab can be placed behind a given page—bending the "U" flap upward; subsequently, inserting a given page until it reaches both apertures or a predetermined distance, yielding a gripping action as well as interference fit. Spatial design that specifically illustrates a definitiveness separation between inner and outermost surface edges in order to facilitate a given message disclosure if deemed necessary.

Figure 4:
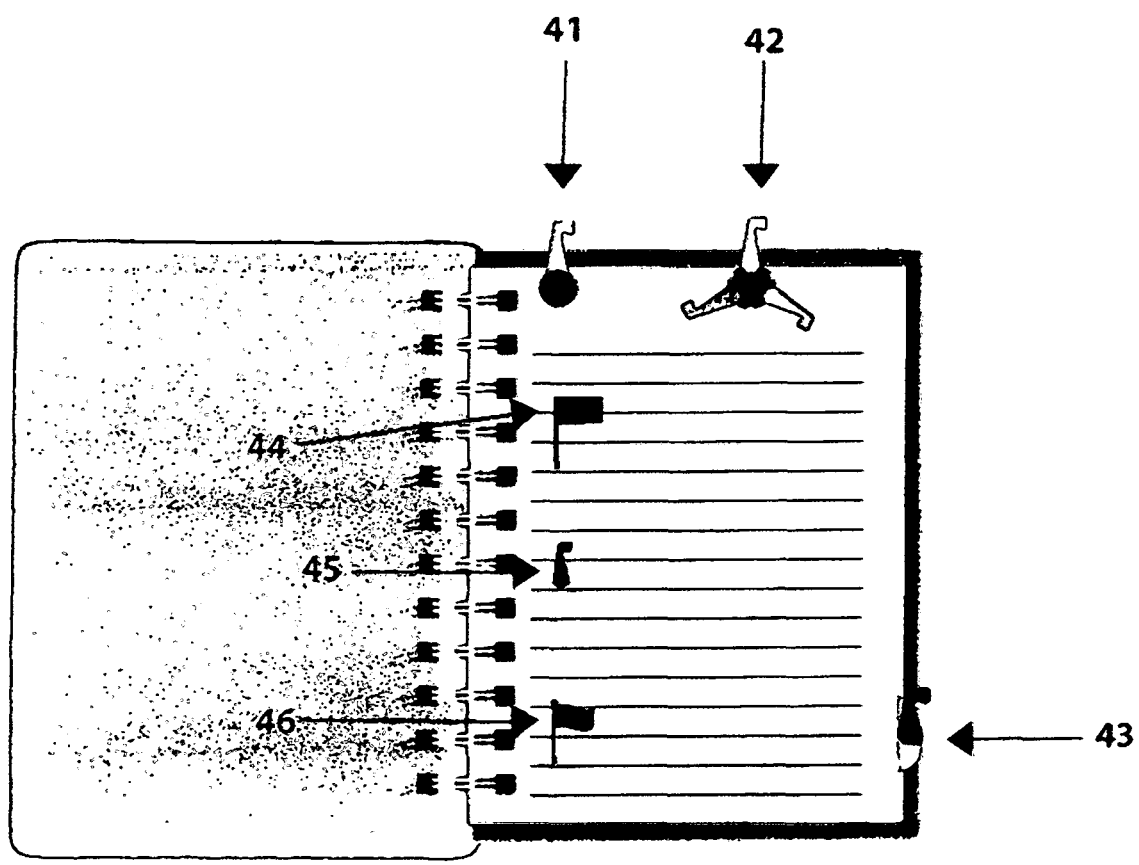
FIG. 4 depicts Rapid Response Tab(s) vs single flag usage within an electronic notebook.

Yet another embodiment FIG. 4, depicts a single flag wheel 41, a multiple flag wheel 42, and a tab flag 43. Individual flags 44, 45, as well as 46 illustrates highlighting flag(s) utilizing pressure sensitive adhesive providing flags to be re-positioned as necessary.

Figure 5:
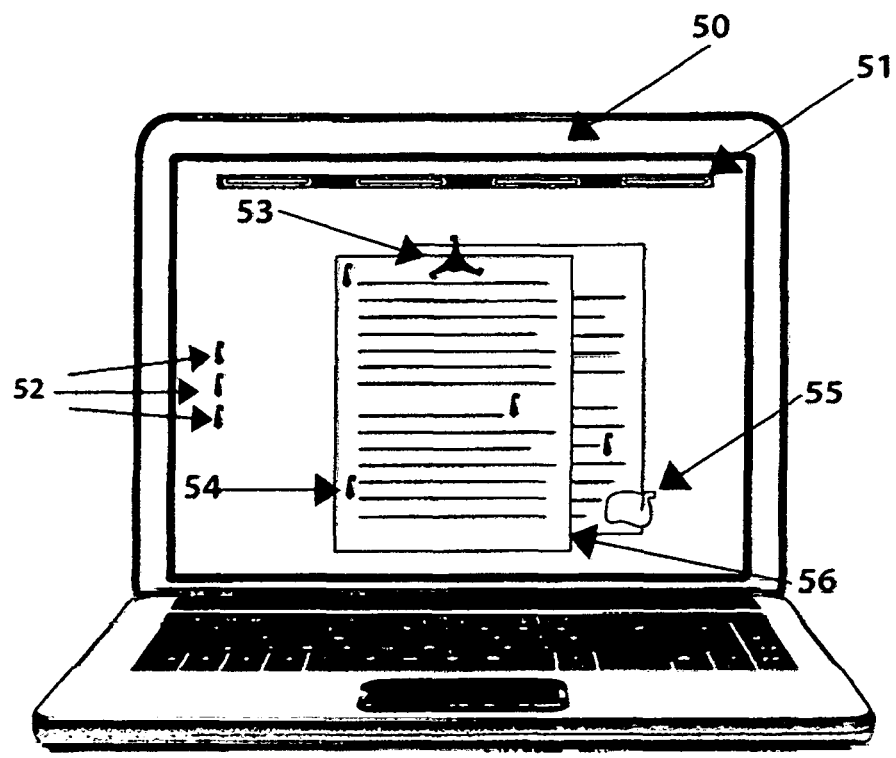
FIG. 5 illustrated a laptop LCD interlace as well as software application with placement of flag wheel, flag tab, and singular flag highlighters being used in a document. Utilization of pop-up menu at the top of application as well as singular flag menu to the left of screen.

The embodiments shown in FIG. 5, provide a computer medium 50. Across the top, a menu bar is illustrated 51 wherein a particular application (word document 56) program code makes a legend and/or pop-up possible which provides a Rapid Response Tab positioning 53, color selection, size, and indicia placement thereon flag(s) 52, 53, 54, and 55.

Figure 6:
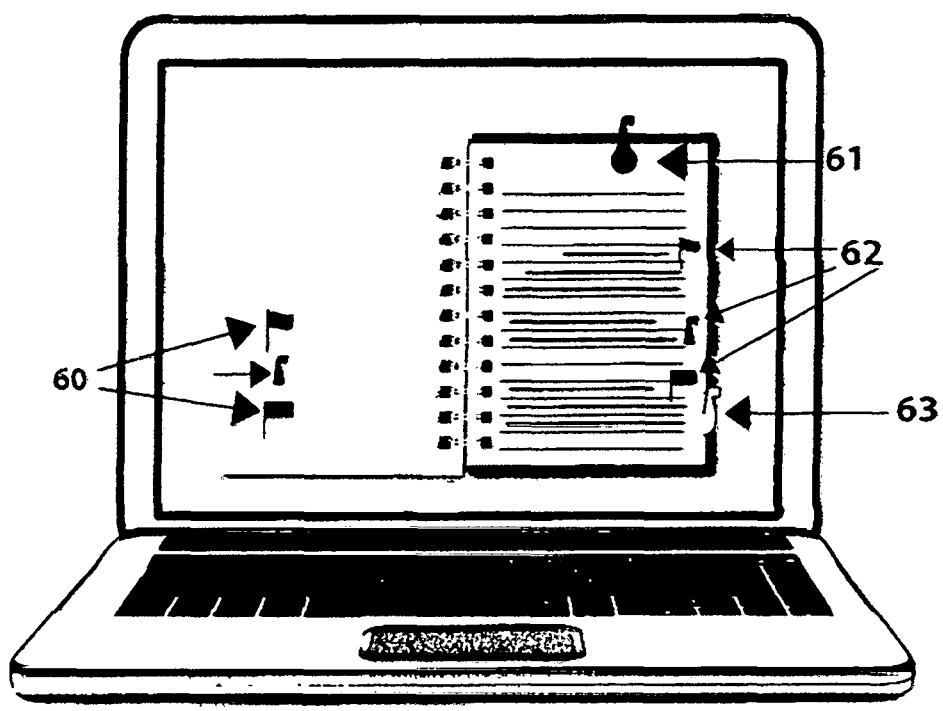
FIG. 6 pictorial depiction of various flags being placed in an electronic notebook.

Another embodiment seen in FIG. 6, a pop-up menu 60 is observed on the bottom left of computer screen while a single flag with wheel base is depicted on the top of a page 61, various individual flags 62 highlight different paragraphs, and a tab-flag 63 is positioned to mark a specific page within a document that contains a plurality of pages.

Figure 7:
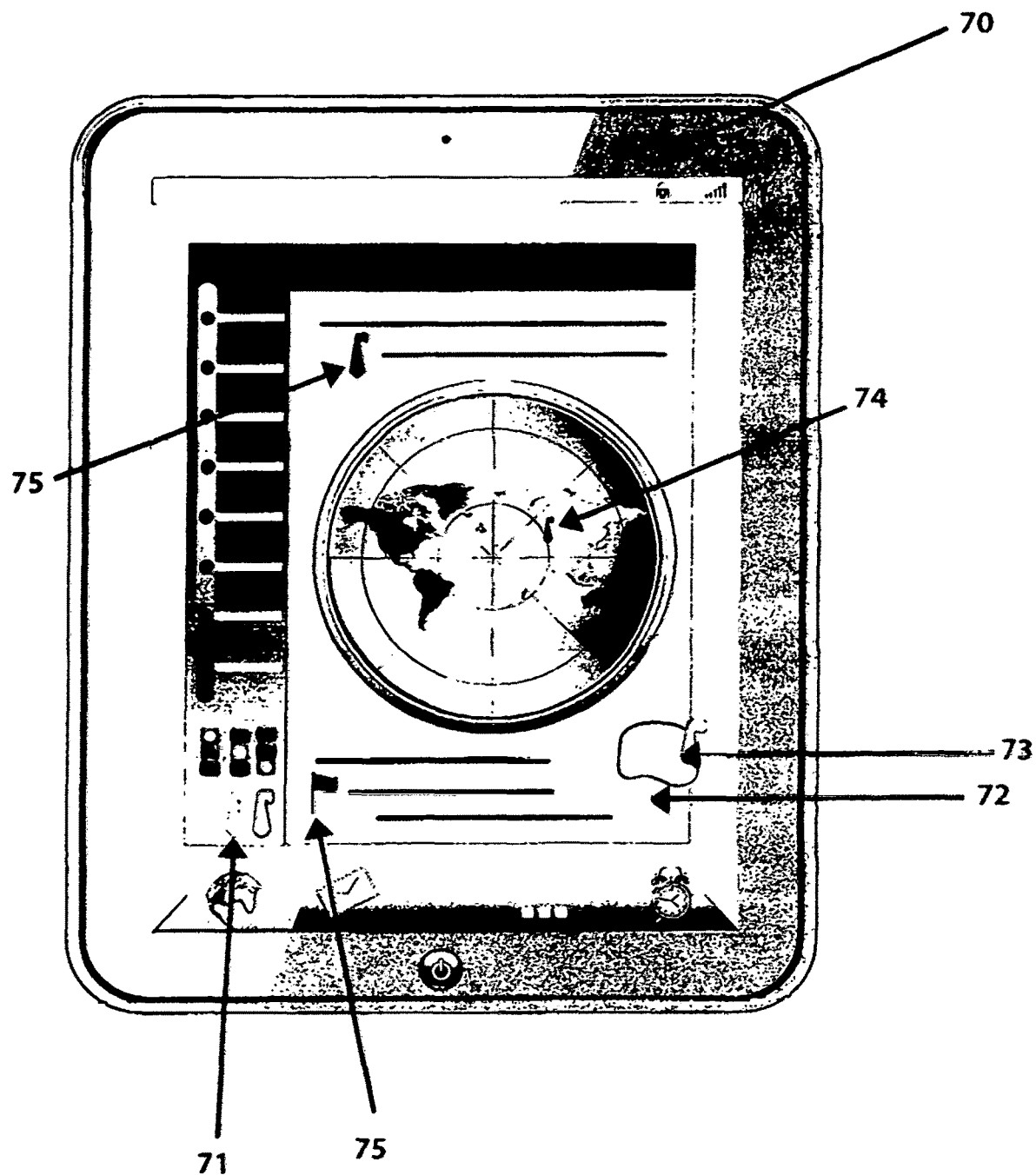
FIG. 7 illustrates a tablet computer and a chart application with an array of flag depictions.

In accordance with the invention, FIG. 7, depicts an electronic chart system used by most professional pilots. The electronic tablet is illustrated 70. Furthermore, oceanic captains also use similar charts which might appear similar. In either case, a menu 71 and/or legend can be utilized with drag-and-drop positioning, color, etc. A tab-flag 72 can be utilized for "marking" a particular page in a Jepp chart manual, one that may have control tower frequencies etc. Importantly, such functionality allows a rapid transition in an environment that warrants such. An integral flag 73 on said tab-flag 72 may be customized with a user defined color combination creating a unique visual. Moreover, individual flags 74 and 75 may be used to highlight or pinpoint map specifics. A smart phone is depicted 76, an example of yet another medium where Rapid Response Tabs can be utilized.

Figure 8:
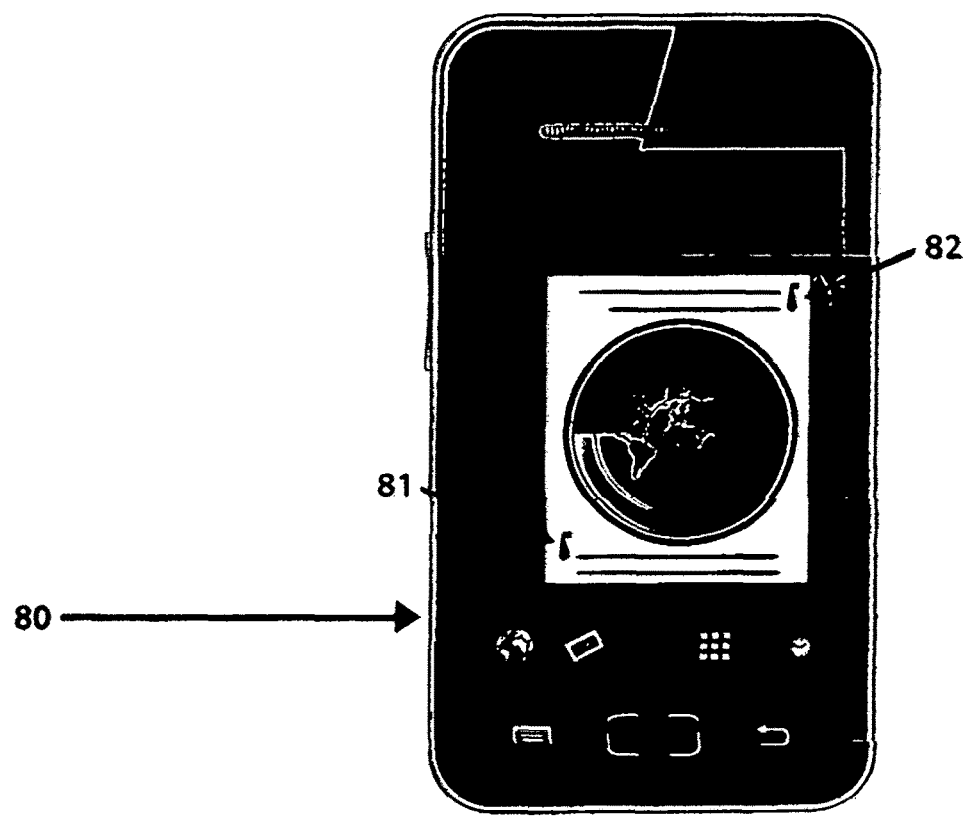
FIG. 8 represents a Mobil phone with chart application and singular flag use.
Figure 9:
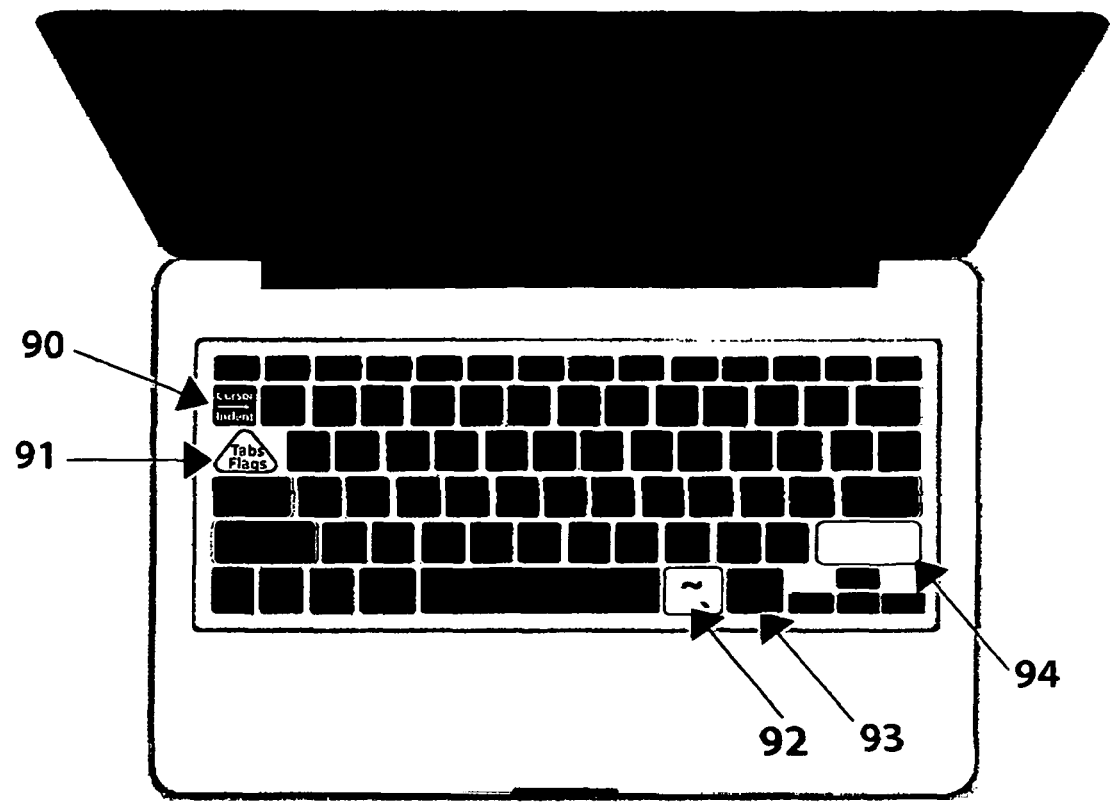
FIG. 9 indicates a triangular "Tabs Flags" key with stacked position of the "Cursor Indent" key while a Tilde key is displaced bottom-right of space bar thereby eliminating a redundant key.

With reference to FIG. 8, illustrates a mobile phone app 80 whereby a flag is used to highlight an important paragraph seen on bottom of a chart 81. Further, a flag prominently draw attention to more date located above a chart.

Yet another embodiment illustrates an alternative key shape. Incorporating a MOM ergonomic design 91. Furthermore, research suggests that a tilde is rarely ever used in English speaking countries; and so . . . for this reason, elimination of said key might well be considered practical and/or moved to an alternate position 92. Doing so, necessitates the elimination of a redundant key seen in PC's 92, 93, 94.

Conspicuously, a tab key 90 is repositioned in this illustration and is renamed (grammatically correct) Cursor Indent.

Figure 10:
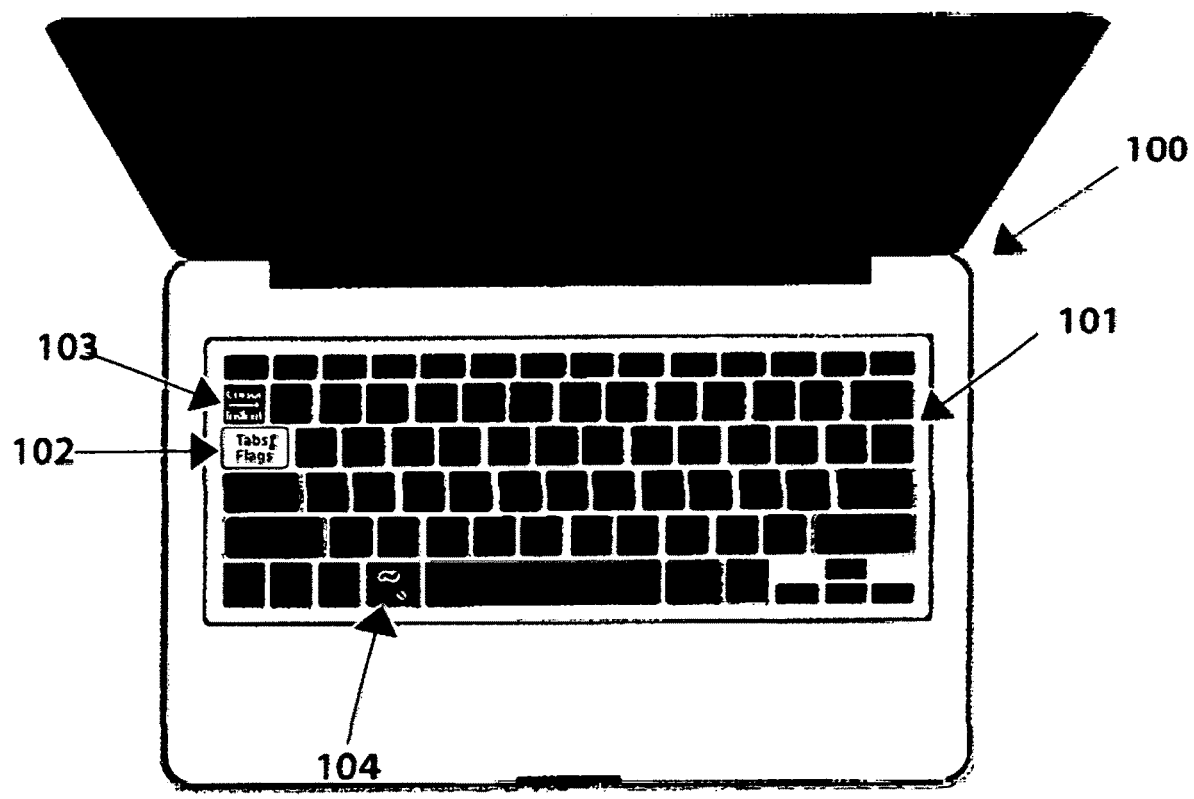
FIG. 10 pictorially describes Tabs Flags key using both indicia as well as a flag symbol while displacing a Tilde key to the bottom-left of space bar thereby eliminating a redundant key.

An embodiment FIG. 10, wherein a computer 100 keyboard 101 is modified from its QWERTY format. The present invention provides a new key i.e. "Tabs Flags" 102. As such, an existing "tab" key 103 is displaced as shown above a tab flags key and its naming convention and icon are modified to reflect its true functionality. In turn, a tilde key is repositioned bottom left of a given computer keyboard space bar.

What is claimed:

1. An electronic keyboard comprising:
   an arrangement of keys having a standard QWERTY arrangement except for the following keys which are modified in position from the standard QWERTY keyboard arrangement:
   a tilde key positioned in a bottom row of the QWERTY keyboard arrangement, to the left and/or right of a space bar, wherein the tilde key provides a function of electronically sending a signal of a tilde character into an electronic document, thereby eliminating a redundant "Alt key" or "Ctrl key" for PC's and, in the case of other computer keyboards, phasing-out unnecessary "Option keys" or "Command keys;" and
   a tab flag key, providing a function of electronically sending a signal assigning a graphical symbol into an electronic document, wherein the tab flag key is positioned left of the Q key in the standard QWERTY keyboard arrangement.

2. An electronic computer keyboard of claim 1, wherein the tab flag key comprises a rectangle or triangular shape.

3. An electronic computer keyboard of claim 1, wherein the tab flag key is labeled with indicia including either the word "tabs" or "flags" or both words "tabs" and "flags".

4. An electronic computer keyboard of claim 1, wherein the tab flag key is labeled with a graphical identification that resembles a flag.

5. An electronic computer keyboard of claim 1, further comprising:
   a cursor indent key (typically known as a tab key in the prior art), providing a same function as the tab key, i.e. moving a cursor several spaces to the right and/or moving a cursor to a next spreadsheet cell, wherein the cursor indent key is displaced from a conventional position in the QWERTY keyboard arrangement on a keyboard, and is located below the tab flag key on the left side of the QWERTY keyboard arrangement.

6. An electronic computer keyboard of claim 5, wherein the cursor indent key is labeled with indicia including either the word "cursor" or "indent" or both words "cursor" and "indent".

7. An electronic computer keyboard of claim 5, wherein the cursor indent key is labeled with indicia including a graphical representation of an object or an arrow pointing to the right, or both the graphical representation of an object and the arrow pointing to the right.

8. An electronic keyboard of claim 5, wherein the cursor indent key is located directly above the tab flag key in the QWERTY keyboard arrangement.

9. An electronic keyboard of claim 1, wherein the tab flag key is configured to provide an interface pop-up menu and/or legend display on a computer screen, tablet, or LCD display
   wherein the interface pop-up menu and/or legend display prompts a user to make a selection of one or more symbols with or without indicia and/or with a capability of adding an indicia or a graphical depiction, and color of said symbol or symbols, indicia or graphical depiction.

10. An electronic keyboard of claim 9, wherein the interface pop-up menu and/or legend display is configured to allow a user to choose from:
    1) a variety of colors including street signal signifiers indicating red, yellow or green colors;
    2) a shape of a flag; and/or
    3) a single flag or a multitude of colored flags.

11. An electronic keyboard of claim 1, wherein an operating system of a computer, tablet, or mobile device is programmed and/or application(s) codes are adapted to incorporate a tab flag key functionality, thereby allowing for a categorical embedment of a legend display and/or pop-up menu which is configured to allow a user to position a flag, select a color of said flag, select a size of said flag, and insert said flag into an electronic document.

12. An electronic keyboard of claim 1, wherein the tab flag key is configured to provide a graphic in an electronic document in order to highlight specific information and prioritize/group particular pages.

13. An electronic keyboard of claim 1, where the tab flag key can be activated by both a mouse or a touch pad, wherein hardware of each of the mouse or touch pad is configured to provide a drag-and-drop function yielding a rapid flag-insertion response capability.

* * * * *